United States Patent [19]

Blum et al.

[11] Patent Number: 5,741,849
[45] Date of Patent: Apr. 21, 1998

[54] AQUEOUS BINDER COMPOSITIONS HAVING A LONG PROCESSING TIME AND THEIR USE IN COATING COMPOSITIONS

[75] Inventors: Harald Blum, Wachtendonk; Eberhard Arning, Kaarst; Rolf Roschu, Willich; Josef Pedain, Köln, all of Germany

[73] Assignee: Bayer Aktiengesellschaft, Leverkusen, Germany

[21] Appl. No.: 666,166

[22] Filed: Jun. 19, 1996

[30] Foreign Application Priority Data

Jun. 26, 1995 [DE] Germany ............... 195 23 103.1

[51] Int. Cl.$^6$ ............... C08J 3/00; C08K 3/20; C08L 75/00; B32B 27/00
[52] U.S. Cl. ............... 524/591; 428/423.1; 524/539; 524/839; 524/840
[58] Field of Search ............... 524/539, 591, 524/839, 840; 428/423.1

[56] References Cited

U.S. PATENT DOCUMENTS

| | | | |
|---|---|---|---|
| 4,206,255 | 6/1980 | Wenzel et al. | 427/393.5 |
| 4,408,008 | 10/1983 | Markusch | 524/591 |
| 4,745,151 | 5/1988 | Noll et al. | 524/591 |
| 4,764,553 | 8/1988 | Mosbach et al. | 524/591 |
| 4,829,122 | 5/1989 | Pedain et al. | 524/591 |
| 5,075,370 | 12/1991 | Kubitza et al. | 524/591 |
| 5,334,637 | 8/1994 | Zwiener et al. | 524/539 |
| 5,387,642 | 2/1995 | Blum et al. | 524/591 |
| 5,422,186 | 6/1995 | Biggeleben et al. | 428/423.3 |

FOREIGN PATENT DOCUMENTS

| | | |
|---|---|---|
| 2047635 | 1/1992 | Canada . |
| 4135571 | 5/1993 | Germany . |
| 94/07932 | 4/1994 | WIPO . |

*Primary Examiner*—Patrick D. Niland
*Attorney, Agent, or Firm*—Joseph C. Gil; Thomas W. Roy

[57] ABSTRACT

The invention relates to an aqueous binder composition having a long processing time (time within which the mixture can be processed without loss of quality) based on aqueous dispersions or solutions of binder mixtures, which contain at least one hydroxyl-group containing polyester dispersion or solution, at least one physically drying, aqueous polyurethane dispersion that is substantially free from hydroxyl or amino groups, and a polyisocyanate. The present invention also relates to the use of these binders in lacquers and coating compositions, in particular for coating rigid, non-flexible substrates.

13 Claims, No Drawings

5,741,849

1

AQUEOUS BINDER COMPOSITIONS HAVING A LONG PROCESSING TIME AND THEIR USE IN COATING COMPOSITIONS

BACKGROUND OF THE INVENTION

1. Field of the Invention

The present invention relates to aqueous binder compositions having a long processing time or pot life and to their use as binders in lacquers and coating compositions, in particular for coating rigid, non-flexible substrates.

2. Description of the Prior Art

Ecological questions play an important role in surface technology. Reducing the amount of organic solvents present in lacquers and coating compositions is an important objective.

In the case of chemically crosslinking polyurethane lacquers, which have great importance in coatings applications because of their outstanding properties, it has not been possible until very recently to dispense with organic solvents.

The use of water instead of organic solvents in two-component polyurethane coating compositions based on polyisocyanates having free isocyanate groups was not believed to be possible since it is known that isocyanate groups can react not only with alcoholic hydroxyl groups, but also with water. In addition, the number of active hydrogen atoms in water is far greater than the number of hydroxyl groups in the isocyanate-reactive component. Therefore, in a ternary system containing polyisocyanate, organic polyhydroxyl compound and water it had to be assumed that an isocyanate/water reaction would occur with the formation of urea and carbon dioxide. The isocyanate/water reaction is detrimental for two reasons: 1) it does not lead to crosslinking of the organic polyhydroxyl compounds and 2) it leads to foam formation in the coating because of the formation of carbon dioxide.

It has recently been disclosed that selected hydroxy-functional copolymers (EP A 358,979), hydroxy-functional polyurethanes (EP-A 469,389), hydroxy-functional polyester urethanes (EP-A 496,205) and hydroxy-functional polyesters (DE-A 4,135,571) can be used in aqueous two-component compositions with polyisocyanates having free isocyanate groups. These coating compositions have a pot life of only a few hours and cure into high-quality, crosslinked films having properties that are comparable to coatings obtained from solvent-containing two-component polyurethane coating compositions.

For quite a few applications, however, the properties of these two-component systems are not sufficient. For example, when lacquering wood, furniture and parquet flooring, rapid drying at room temperature is required together with a very long processing time. In addition, it is very important for this use, and particularly for do-it-yourself (DIY) and handicraft applications, for the binder compositions to be manufactured very simply, without technical aids being required, and for the binder compositions to be processed easily.

These requirements can be fulfilled to only a limited extent, if at all, with known binder compositions, particularly in cases where very good optical properties, e.g. richness and brilliance, and very good chemical resistance properties, e.g. towards water and ethanol, are required.

An object of the present invention is to provide binder compositions that satisfy the preceding requirements.

Surprisingly it has now been found that the binder compositions according to the invention, which are based on

2 mixtures of aqueous binders containing hydroxy-functional polyester dispersions or solutions, physically drying, aqueous polyurethane dispersions and polyisocyanates, satisfy the preceding requirements, in particular regarding ease of manufacture and processability of the binder compositions.

SUMMARY OF THE INVENTION

The present invention relates to an aqueous binder composition containing

A) 65 to 97 wt % of an aqueous polyol component having a viscosity at 23° C. of 25 to 15,000 mPa.s and containing a mixture of
 A1) at least one dispersion or solution of a hydroxyl group-containing polyester containing carboxylate and/or sulphonate groups, having a weight average molecular weight of 1,000 to 40,000, an OH number of 15 to 100 mg KOH/g dispersion or solution and an acid number, based on all of the carboxylate, carboxyl and sulphonate groups of 2 to 40 mg KOH/g dispersion or solution, wherein the polyester is based on the reaction product of
  a1) 65 to 100 wt % of one or more polyester precursors prepared from
   a1.1) 0 to 40 wt % of one or more monocarboxylic acids,
   a1.2) 20 to 65 wt % of one or more di-, tri-, and/or tetra-functional alcohols,
   a1.3) 20 to 60 wt % of one or more di- and/or trifunctional carboxylic acids or their anhydrides and
   a1.4) 0 to 10 wt % of one or more compounds containing sulphonate and carboxyl groups and optionally hydroxyl groups,
  a2) 0 to 15 wt % of one or more carboxylic acid anhydrides or hydroxycarboxylic acids,
  a3) 0 to 22 wt % of one or more di- or polyisocyanates and
  a4) 0 to 8 wt % of one or more mono-, di- and/or trifunctional compounds containing hydroxyl and/or amino groups and
 A2) at least one physically drying, aqueous polyurethane dispersion containing carboxylate and/or sulphonate groups, and
B) 3 to 35 wt % of a polyisocyanate component having a viscosity at 23° C. of 50 to 10,000 mPa.s and containing one or more organic polyisocyanates, wherein components A) and B) are present at an NCO/OH equivalent ratio, based on the isocyanate groups of component B) and the hydroxyl groups of the polyol component A1) of component A), of 0.3:1 to 2:1.

The present invention also relates to a coating composition containing the binder compositions according to the invention as the binder.

DETAILED DESCRIPTION OF THE INVENTION

Component A) is an aqueous solution or dispersion (in general both dissolved and dispersed particles are present) of a polyol component containing a mixture of resins. The aqueous solution or dispersion preferably has a solids content of 25 to 55, more preferably 30 to 50 wt %.

The polyol mixtures are based on mixtures of components A1) and A2). Component A1) is present in an amounts of 25 to 95, preferably 40 to 90 and more preferably 50 to 85 wt %, which component A2) is present in an amount of 5 to 75, preferably 10 to 60 and more preferably 15 to 50 wt %. It is also possible, but less preferred, to use mixtures of polyols as component A1) and mixtures of physically drying resins as component A2).

Component A1) is selected from polyester resins containing carboxylate and hydroxyl groups, which are dispersed or dissolved in water, which preferably have a weight average molecular weight ($M_w$, determined by gel permeation chromatography using calibrated polystyrene as the standard) of 1,000 to 40,000, more preferably 2,000 to 30,000, and an OH number of 15 to 100, preferably 20 to 75 mg KOH/g of dispersion or solution.

Component A1) is preferably present as a 25 to 60, more preferably a 30 to 55 wt % aqueous solution or dispersion, which preferably has a viscosity of 25 to 15,000, more preferably of 75 to 8,000 mPa.s at 23° C. and preferably has a pH of 5 to 10, more preferably of 6 to 9.

According to the molecular weight of the polyester resin, the content of carboxylate groups and optionally carboxyl or sulphonate groups, the nature and amount of the neutralizing agent and the additives optionally used, component A1) is present as a solution or as a dispersion. In general both dissolved and dispersed portions exist.

Suitable carboxylate and hydroxyl group-containing polyester dispersions or solutions A1) may be prepared in various ways, e.g. they may be based on the reaction product of a1) 85 to 95, preferably 88 to 94 wt % of one or more polyester precursors prepared from
   a1.1) 0 to 40, preferably 0 to 25 wt % of one or more monocarboxylic acids,
   a1.2) 20 to 65, preferably 30 to 60 wt % of one or more di-, tri- and/or tetrafunctional alcohols and
   a1.3) 20 to 60, preferably 28 to 56 wt % of one or more di- and/or trifunctional carboxylic acids or their anhydrides, and
a2) 5 to 15, preferably 7 to 12 wt % of one or more acid anhydrides.

Polyester dispersions or solutions A1) may also be based on the reaction product of
   a1.1) 0 to 40, preferably 0 to 25 wt % of one or more monocarboxylic acids,
   a1.2) 20 to 60, preferably 28 to 54 wt % of one or more di-, tri- and/or tetrafunctional alcohols and
   a1.3) 20 to 60, preferably 28 to 54 wt % of one or more di- and/or trifunctional carboxylic acids or their anhydrides and
   a1.4) 2 to 25, preferably 3 to 15 wt % of one or more compounds containing sulphonate and carboxyl groups and optionally hydroxyl groups.

In a further embodiment polyester dispersions or solutions A1) may be based on the reaction product of
   a1.1) 70 to 92, preferably 73 to 89 wt % of one or more polyester precursors prepared from
      a1.1) 0 to 40, preferably 0 to 25 wt % of one or more monocarboxylic acids,
      a1.2) 20 to 65, preferably 30 to 60 wt % of one or more di-, tri- and/or tetrafunctional alcohols and
      a1.3) 20 to 60, preferably 28 to 56 wt % of one or more di- and/or trifunctional carboxylic acids or their anhydrides,
   a2) 2.0 to 8.5, preferably 2.5 to 7.5 wt % of dimethylolpropionic acid, dimethylolbutyric acid and/or hydroxypivalic acid,
   a3) 6 to 22, preferably 7.5 to 19.5 wt % of one or more di- or polyisocyanates and
   a4) 0 to 8, preferably 0 to 6 wt % of one or more mono-, di- and/or trifunctional compounds having hydroxyl and/or amino groups.

In a preferred embodiment polyester dispersions or solutions A1) are based on the reaction product of
   a1) 76 to 87 wt % of one or more polyester precursors prepared from
      a1.1) 0 to 8 wt % of one or more monocarboxylic acids,
      a1.2) 40 to 57 wt % of one or more di- and trifunctional alcohols having a molecular weight of 62 to 192,
      a1.3) 40 to 56 wt % of one or more difunctional carboxylic acids or their anhydrides having a molecular weight of 98 to 540,
   a2) 3.5 to 6.5 wt % of dimethylolpropionic acid,
   a3) 7.5 to 16 wt % of one or more di- or polyisocyanates, provided that at least 50 wt % of component a3) is hexamethylene diisocyanate and
   a4) 0 to 3 wt % of one or more di- or trifunctional alcohols having a molecular weight of 62 to 160 or amino alcohols having a molecular weight of 61 to 160.

The percentages given under a1) to a4) and under a1.1), a1.2) and a1.4) add up to 100% in each case.

The manufacture of the polyesters a1) from a1.1), a1.2), a1.3) and a1.4) takes place, e.g., by a known polycondensation reaction, optionally with the assistance of conventional esterification catalysts, preferably by melt or azeotropic condensation at temperatures of 140° to 240° C.

The polyesters a1) are then optionally reacted with components a2), a3) and/or a4) at 60° to 160° C. This reaction can be carried out in the absence of solvents or in the presence of an inert organic solvent with the optional assistance of suitable urethanizing catalysts.

Suitable components a1.1) include benzoic acid, 2-ethylhexanoic acid, isononanoic acid, saturated $C_4$–$C_{20}$-fatty acid mixtures (such as Prifac 7900, Prifac 2960 or Prifac 2980 from Unichema International), soya bean oil fatty acid, peanut oil fatty acid, castor oil fatty acid and oleic acid. Preferred components a1.1) are benzoic acid, 2-ethylhexanoic acid, Prifac 2960 fatty acid mixture and soya bean oil fatty acid.

Suitable components a1.2) include ethylene glycol, 1,2- and 1,3propanediol, 1,2-, 1,3- and 1,4-butanediol, 1,6-hexanediol, 1,4-cyclohexane diol, 1,4-cyclohexane dimethanol, diethylene glycol, triethylene glycol, dipropylene glycol, tripropylene glycol, neopentyl glycol, trimethyl hexanediol, tricyclodecanediol, trimethylol propane, glycerol, pentaerythritol and trimethylol propane.

Preferred components a1.2) have a molecular weight of 62 to 192 and include ethylene glycol, 1,2-propanediol, 1,6-hexanediol, 14-cyclohexane dimethanol, diethylene glycol, neopentyl glycol and trimethylol propane.

Suitable components a1.3) include phthalic acid (anhydride), isophthalic acid, tetrahydrophthalic acid (anhydride), hexahydrophthalic acid (anhydride), maleic acid (anhydride), succinic acid (anhydride), fumaric acid, adipic acid, dimeric fatty acid, trimeric fatty acid and trimellitic acid (anhydride). Preferred components a1.3) have a molecular weight of 98 to 540 and include phthalic acid anhydride, isophthalic acid, hexahydrophthalic acid anhydride, adipic acid and dimeric fatty acid.

Suitable components a1.4) include lithium salts, potassium salts, sodium salts, magnesium salts, calcium salts and tertiary amine salts of 5-sulphoisophthalic acid, sulphobenzoic acid, sulphophthalic acid, dimethylsulphoisophthalic acid, 3-hydroxy-5-sulphobenzoic acid and 2hydroxy-5-sulphobenzoic acid. The sulphonate diols disclosed in DE-A 2,446,440 (U.S. Pat. No. 4,108,814) are also suitable as component a1.4).

Preferably, component a1.4) is selected from the carboxyl group-containing sulphonates obtained by neutralizing the sulpho acid groups of aromatic sulphocarboxylic acids having a molecular weight of 224 to 360 with lithium, potassium or sodium hydroxide, carbonate or bicarbonate or with t-amines.

Suitable components a2) include trimellitic acid anhydride, tetrahydrophthalic acid anhydride, dimethylol propionic acid, dimethylol butyric acid and pivalic acid. Preferred components a2) are trimellitic acid anhydride, tetrahydrophthalic acid anhydride and dimethylol propionic acid.

Suitable components a3) include hexamethylene diisocyanate, perhydro-2,4- and -4,4'-diphenylmethane diisocyanate, isophorone diisocyanate, toluylene diisocyanate, diphenylmethane diisocyanate and other isocyanates such as those described in "Methoden der organischen Chemie" (Houben-Weyl, Vol. 14/2, 4th Edition, Georg Thieme Verlag Stuttgart, 1963, pp. 61 to 70).

Also suitable are lacquer polyisocyanates prepared from hexamethylene diisocyanate, isophorone diisocyanate and toluylene diisocyanate and containing, e.g. urethane groups, uretdione groups, isocyanurate and/or biuret groups. Hexamethylene diisocyanate or isocyanate mixtures which contain at least 50 wt % of hexamethylene diisocyanate are preferred.

Suitable components a4) include neopentyl glycol, ethylene glycol, trimethylol propane, fatty alcohol mixtures (such as Ocenol 110/t30 from Henkel AG), monofunctional polyethers based on ethylene oxide and having a molecular weight of 350 to 2,500, ethanolamine, ethylenediamine, diethanolamine and hexanediol.

Preferred components a4) are neopentyl glycol, ethylene glycol, trimethylol propane and monofunctional polyethers based on ethylene oxide with a molecular weight of 350 to 2,300. More preferably, component a4) is selected from di- or trifunctional alcohols having a molecular weight of 62 to 160.

Suitable organic solvents for manufacturing polyester resins A1) include N-methyl pyrrolidone, diethylene glycol dimethyl ether, methyl ethyl ketone, methyl isobutyl ketone, acetone, xylene, toluene, butyl acetate, methoxypropyl acetate and mixtures of these or other solvents. The organic solvents may be completely or partially removed from the reaction mixture before, during or after the dispersion step azeotropically, by the application of a vacuum or by an intensified inert gas flow.

Suitable catalysts for the urethanization reaction are known and include tertiary amines such as triethylamine; metallic compounds such as tin(II)octoate, dibutyltin oxide and dibutyltin dilaurate. Suitable catalysts for the esterification reaction include dibutyltin oxide and paratoluenesulphonic acid.

During the manufacture of the polyester resins, if sufficient amounts of salt groups are not present to provide water dispersibility, then preferably 30 to 100, more preferably 50 to 100% of the incorporated acid groups are converted to the salt form. A stoichiometric excess of the neutralizing agents may be used.

After the manufacture of the polyester resins, it is also possible to add small amounts of other organic solvents or reactive thinners (such as ethanol, propanol, ethylene glycol, propylene glycol, butanol, butyl glycol, hexanol, octanol, butyl diglycol, glycerol, ethyl diglycol, methyl diglycol and methoxypropanol) to obtain special properties.

Polyester resins A1) may be dispersed in accordance with several embodiments, i.e., a water/neutralizing agent mixture may be added to the resin, water may be added to the resin/neutralizing agent mixture, the resin may be added to the water/neutralizing agent mixture or the resin/neutralizing agent mixture may be added to water. The dispersibility of the resin in water may be improved, if desired, by the additional use of external emulsifiers, such as ethoxylated nonylphenol, during dispersion.

The dispersion step is preferably carried out at 40° to 120° C. The aqueous solutions or dispersions of polyester resins A1) preferably have a solids content of 25 to 55, preferably 30 to 50 wt %. The aqueous resins should not contain solvents and reactive thinners in an amount of more than 8, preferably not more than 6 and more preferably not more than 4 wt %, based on the weight of the polyester dispersion or solution.

Component A2) is selected from carboxylate and/or sulphonate group-containing polyurethane dispersions which dry physically, are substantially free from and preferably do not contain unreacted hydroxyl groups or amino groups and are suitable for coating various substrates, preferably rigid, non-flexible substrates. Suitable dispersions are described, e.g., in DE-A 3,641,494 (U.S. Pat. No. 4,764,553, herein incorporated by reference) and DE-A 3,613,492 (U.S. Pat. No. 4,745,151, herein incorporated by reference). Preferably, the aqueous dispersions of component A2) have a solids content of 25 to 50 wt %, a viscosity of 25 to 7,000, more preferably 50 to 2,500, mPa.s at 23° C. and a pH of 4 to 10, more preferably 5 to 9.

The polyurethane dispersions are preferably based on the reaction product of a2.1) difunctional compounds having a molecular weight of 300 to 5,000, selected from difunctional polyesters prepared from dicarboxylic acids and diols, difunctional polymers prepared from caprolactone, difunctional, aliphatic polycarbonates, and/or difunctional polyethers based on propylene oxide, ethylene oxide and/or tetrahydrofuran, a2.2) up to 10%, based on the weight of a2.1), of compounds having a higher functionality, such as those previously described for use as component a1.1), a2.3) polyols, polyamines or amino alcohols having a molecular weight of 60 to 299, a2.4) compounds having carboxyl or carboxylate groups and/or nonionically hydrophilic polyether groups and a2.5) at least difunctional polyisocyanates having a molecular weight of 140 to 1,000.

More preferably, the polyurethane dispersions have weight average molecular weights ($M_w$, determined as previously described) of greater than 25,000; contain ammonia, triethylamine, N-methylmorpholine and/or dimethylisopropanolamine as neutralizing agent; have an acid number of 3 to 20 mg KOH/g dispersion; and a minimum film formation temperature (DIN 53 767) of >10° C.

Most preferably, the polyurethane dispersions contain ammonia or triethylamine as neutralizing agent, have an acid number of 4 to 15 mg KOH/g dispersion, have a minimum film formation temperature of >20° C. and contain cycloaliphatic diisocyanates as the di- or polyisocyanate component.

Solvents can also be used for the manufacture of the component A2). However, the quantity of these solvents is either initially limited or subsequently reduced after the manufacture of the individual components A1) to A2), such that aqueous polyol component A) contains solvents in an amount of not more than 10 wt %, preferably not more than 5 wt % and more preferably not more than 3 wt %.

To prepare aqueous solutions or dispersions A), the aqueous solutions or dispersions of individual components A1)

and A2) are mixed with one another by simple stirring. The resulting mixture should contain at least 5 wt % of each of the individual components A1) and A2). The aqueous solutions or dispersions A) have viscosities of 25 to 15,000, preferably 50 to 3 500 mPa.s at 23° C.

Polyisocyanate component B) has a viscosity of 50 to 10,000, preferably 50 to 3,000 mPa.s at 23° C. and is based on organic polyisocyanates which are liquid at room temperature and have aliphatically, cycloaliphatically, araliphatically and/or aromatically bound isocyanate groups. Preferably, polyisocyanate component B) is based on polyisocyanates or polyisocyanate mixtures exclusively having aliphatically and/or cycloaliphatically bound isocyanate groups and has an average NCO functionality of 1.8 to 4.0, a viscosity at 23° C. of 50 to 1,000 mPa.s and contains 5 to 20 wt %, preferably of 8 to 14 wt %, based on resin solids, of incorporated hydrophilic, nonionic groups.

If necessary, the polyisocyanates can be used in admixture with small amounts of inert solvents in order to reduce the viscosity to a value within the previously disclosed ranges. However, the amount of these solvents is limited such that the resulting coating compositions according to the invention do not contain more than 20 wt % of solvents, based on the amount of water. This solvent content also includes any solvent present in polyol component A).

Suitable solvents for the polyisocyanates include aromatic hydrocarbons such as "solvent naphtha" and the solvents previously set forth for use in polyol component A).

Preferred polyisocyanates B) include "lacquer polyisocyanates" based on hexamethylene diisocyanate, 1-isocyanato-3,3,5-trimethyl-5-isocyanatomethyl-cyclohexane (IPDI) and/or bis(isocyanatocyclohexyl)methane, especially those exclusively based on hexamethylene diisocyanate. These "lacquer polyisocyanates" are known and include polyisocyanates prepared from these diisocyanates, which contain biuret, urethane, allophanate, uretdione and/or isocyanurate groups, which have been freed of surplus starting diisocyanate in known manner, preferably by distillation, such that they have a residual content of less than 0.5 wt % of unreacted diisocyanates.

The preferred lacquer polyisocyanates include polyisocyanates prepared from hexamethylene diisocyanate and containing biuret groups, such as those described in U.S. Pat. Nos. 3,124,605, 3,358,010, 3,903,126, 3,903,127 or 3,976,622. These polyisocyanates contain mixtures of N,N',N"-tris-(6-isocyanatohexyl)-biuret with lesser amounts of its higher homologs. Also preferred are polyisocyanate containing isocyanurate groups and prepared from hexamethylene diisocyanate, such as those described in U.S. Pat. No. 4,324,879. These polyisocyanates contain N,N',N"-tris-(6-isocyanatohexyl)-isocyanurate in admixture with lesser amounts of its higher homologs.

Especially preferred are polyisocyanates prepared from hexamethylene diisocyanate and containing mixtures of uretdione and/or isocyanurate groups, which may be obtained by the catalytic oligomerization of hexamethylene diisocyanate in the presence of trialkyl phosphine catalysts. These polyisocyanates have a viscosity at 23° C. of 50 to 500 mPa.s and an NCO functionality of 2.2 to 5.0.

Also suitable according to the invention are lacquer polyisocyanates based on 2,4-diisocyanato-toluene or mixtures thereof with 2,6-diisocyanatotoluene and polyisocyanates based on 4,4'-diisocyanatodiphenylmethane or mixtures thereof with its isomers and/or higher homologs. Suitable aromatic lacquer polyisocyanates include those containing urethane groups, which may be obtained by reacting excess amounts of 2,4-diisocyanatotoluene with polyvalent alcohols, such as trimethylol propane, and subsequently removing unreacted starting diisocyanate by distillation.

Other suitable aromatic lacquer polyisocyanates include polyisocyanates containing isocyanurate groups and prepared from the monomeric diisocyanates mentioned, which have also been freed of excess monomeric diisocyanates, preferably by distillation, after their manufacture.

The use of hydrophilically-modified polyisocyanates is particularly recommended. The ability to emulsify the polyisocyanate into the aqueous phase is improved in this way and in some cases an additional improvement of the pot life is obtained. These hydrophilic polyisocyanates may be obtained reacting di- or polyisocyanates with monofunctional polyethers prepared from ethylene oxide and optionally propylene oxide, and/or by the incorporation of carboxylate groups by reacting di- or polyisocyanates with carboxylic acids containing hydroxyl groups, e.g. 2,2-dimethylolpropionic acid or hydroxypivalic acid, with subsequent neutralization.

Preferred hydrophilic polyisocyanates are hexamethylene diisocyanate-based polyisocyanates which contain 5 to 20, preferably 8 to 14 wt % of nonionically hydrophilic groups.

Polyisocyanate component B) may also be made up of mixtures of the preceding polyisocyanates.

For the manufacture of the coating compositions according to the invention polyisocyanate component B) is mixed with the aqueous dispersion A), wherein the dissolved or dispersed component A) can function as an emulsifier for the polyisocyanate.

The mixing takes place by simple stirring at room temperature. The amount of the polyisocyanate component is selected to provide an NCO/OH equivalent ratio, based on the isocyanate groups of component B) and the alcoholic hydroxyl groups of component A), of 0.3:1 to 2:1, preferably 0.6:1 to 1.5:1. Prior to addition of the polyisocyanate component B) the known additives of lacquer technology can be incorporated into the dispersion or solution of the polyols. These additives include defoaming agents, flow-control agents, pigments and dispersion aids for pigment distribution.

The coating compositions can be processed directly without any additional processing steps, such as the laborious and time-consuming addition of water, thickeners or neutralizing agents, and possess a very long processing time of about 5 to 10 hours.

The coating compositions are suitable for many areas of use in which solvent-containing, solvent-free or other types of aqueous painting and coating compositions having an enhanced range of properties are currently used, e.g., for coating various substrates composed of mineral building materials such as lime- and/or cement-bonded plasters, surfaces containing gypsum, fibrated concrete building materials and concrete; lacquering and sealing of wood and wooden materials such as particle board, wood fiber boards and paper; lacquering and coating of metallic surfaces; and coating and lacquering of asphaltic and bituminous road surfaces.

The coating compositions according to the invention are particularly suitable for the lacquering or coating of rigid, non-flexible substrates, in particular of wood, wooden materials, furniture, parquet flooring etc. Because of their ease of manufacture, miscibility and processing, the coating compositions are particularly suitable for the handicraft applications sector or for applications in which special equipment is not needed for the manufacture and application of the coating compositions.

The curing or cross-linking of the two-component system can take place after application to the substrate at temperatures of 0° to 200° C., preferably at room temperature.

EXAMPLES

In the following examples all parts and percentages are by weight unless otherwise indicated. All of the products were manufactured under a nitrogen atmosphere. The viscosities were determined at 23° C. with a rotational viscosimeter for a mean rate of shear of between 25 and 75 $s^{-1}$.

1) Polyisocyanate 1

A hydrophilic polyisocyanate containing isocyanurate groups and prepared from hexamethylene diisocyanate (Bayhydur-VP LS 2032, Bayer AG), dissolved 75% in butyl glycol acetate. NCO equivalent weight of the solution: 325 g.

2) Manufacture of a polyester resin dispersion A1)

525 g of trimethylol propane, 1907 g of 1,6-hexanediol, 905 g of hexahydrophthalic acid anhydride and 1480 g of isophthalic acid were weighed under a $N_2$ atmosphere into a 5 liter reaction vessel equipped with stirring, cooling and heating equipment as well as a water separator and heated to 160° C. in 2 hours. The mixture was then heated to 220° C. in 10 hours and esterified until the acid number was approx. 5 mg KOH/g solids. The OH number of the polyester was then 188 mg KOH/g solids.

2200 g of the polyester described above, 105 g of dimethylol propionic acid, 4 g of trimethylol propane, 208 g of methoxypropyl acetate and 3 g of dibutyltin dioctoate were weighed into a 5 liter reaction vessel equipped with stirring, cooling and heating equipment and homogenized at 80° C. 290 g of hexamethylene diisocyanate were then added at once and the reaction mixture was stirred at 120° C. until NCO groups were no longer detectable. The resulting polyester was dispersed in a water/ammonia/dimethylethanolamine mixture. An aqueous polyester dispersion A1) was obtained having a solids content of approx. 46%, a pH of approx. 7.7, a neutralization degree of 100%, an acid number of approx. 9 mg KOH/g dispersion, a hydroxyl group content of approx. 1.7% (corresponding to an OH number of approx. 57 mg KOH/g dispersion) and a viscosity of approx. 150 mPa.s at 23° C.

3) Manufacture of a polyester resin dispersion A1)

4930 g of phthalic acid anhydride, 970 g of 2-ethylhexanoic acid, 1800 g of peanut oil fatty acid, 1060 g of neopentyl glycol and 4500 g of trimethylolpropane were weighed into a 15 liter reaction vessel equipped with stirring, cooling and heating equipment as well as a water separator and esterified at 220° C. until an acid number of approx. 5 mg KOH/g solids was obtained. The polyester had an OH number of 187 mg KOH/g solids.

1580 g of the polyester precursor described above, 100 g of dimethylol propionic acid, 2 g of dibutyltin dioctoate and 272 g of N-methylpyrrolidone were homogenized in a 5 liter reaction vessel equipped with stirring, cooling and heating equipment at 80° C., mixed at once with 140 g of isophorone diisocyanate and 140 g of hexamethylene diisocyanate and stirred at 110° C. until NCO groups were no longer detectable. The resulting polyester was dispersed in a water/ammonia/dimethylisopropanolamine mixture. An aqueous polyester dispersion A1) was obtained having a solids content of approx. 38%, a pH of approx. 7.7, an acid number of approx. 10 mg KOH/g dispersion, a hydroxyl group content of approx. 1.8% (corresponding to an OH number of approx. 60 mg KOH/g dispersion) and a viscosity of approx. 100 mPa.s at 23° C.

4) Manufacture of a polyester resin dispersion A1)

110 g of lithium sulphoisophthalic acid, 470 g of isophthalic acid, 56 g of neopentyl glycol, 215 g of trimethylolpropane and 1.2 g of dibutyltin octoate were weighed into a 3 liter reaction vessel equipped with stirring, cooling and heating equipment and a water separator and heated to 180° C. The mixture was condensed until a clear solution was obtained. The mixture was then cooled to 150° C. and 968 g of phthalic acid anhydride were added. After heating to 220° C. the mixture was condensed until an acid number of approx. 17 mg KOH/g solids was obtained. The mixture was then cooled to 150° C., 142 g of a glycidyl ester of versatic acid (Cardura E10, Shell Chemie) were added and the whole was reacted until an acid number of approx. 7 mg KOH/g solids was obtained. The resulting polyester was dispersed in a water/dimethylethanolamine mixture. A polyester dispersion A1) was obtained having a solids content of approx. 30%, a pH of approx. 8.0, an acid number of approx. 2 mg KOH/g dispersion, a hydroxyl group content of approx. 0.7% (corresponding to an OH number of approx. 24 mg KOH/g dispersion) and a viscosity of approx. 150 mPa.s at 23° C.

5) Manufacture of a polyester resin solution A1)

1750 g of 1,6-hexanediol, 875 g of trimethylol propane, 600 g of adipic acid and 2400 g of phthalic acid anhydride were weighed into a 10 liter reaction vessel equipped with stirring, cooling and heating equipment and a water separator, heated to 230° C. and condensed until the acid number was approx. 5 mg KOH/g solids. The mixture was cooled to 130° C., 625 g of tetrahydrophthalic acid anhydride were added and the mixture was reacted until an acid number of approx. 45 mg KOH/g solids was obtained. 150 g of butyl glycol were then added to the polyester and the mixture was dissolved in a dimethylethanolamine/water mixture. A polyester solution A1) was obtained having a solids content of approx. 28%, a pH of approx. 8.4, an acid number of approx. 13 mg KOH/g solution, a hydroxyl group content of approx. 0.6% (corresponding to an OH number of approx. 20 mg KOH/g solution) and a viscosity of approx. 200 mPa.s at 23° C.

6) Polyurethane dispersion A2)

A physically drying, aqueous polyurethane dispersion produced according to Example 1 of EP 242,731 (U.S. Pat. No. 4,745,151). The dispersion had a solids content of approx. 33%, a pH of approx. 7.5, an acid number of approx. 8 mg KOH/g dispersion and a viscosity of approx. 150 mPa.s at 23° C.

Application example 1
(comparison)

27 g of water, 0.5 g of a wetting/flow control agent (Byk 346, Byk Chemie), 1.5 g of a wetting additive (Surfynol 104 E, Air Products) and 1.4 of a 5% aqueous thickener solution (Acrysol RM 8, Rohm & Haas) were added to 48.4 g of polyester dispersion A1) from Example 2 and homogenized. 23 g of polyisocyanate 1) were then stirred in. The weight ratio of component A1) to component A2) was 100:0, based on the resin solids of each component. An aqueous binder composition having a processing time of about 6 hours was obtained. The viscosity of the binder composition passed through a minimum during this processing time and then increased. To maintain the optimum application viscosity required either a further addition of thickener to increase the viscosity or a further addition of water to reduce the viscosity. This re-working is not acceptable for many applications, in particular in the handicrafts or DIY sector. In addition, a coating prepared from this dispersion had a dust dry time of approx. 10 hours at room temperature, which was too long. The cured coating possessed good overall properties after curing for 7 days. The solvent, ethanol and water resistance, the mechanical properties and the optical properties (flow, richness, brilliance) were good.

Application example 2
(according to the invention)

27 g of water, 0.5 g of the wetting/flow control agent, 1.5 g of the wetting additive and 1.4 of the 5% aqueous thickener solution (all of which were described in application example 1) and 9.7 g of polyurethane dispersion A2) from Example 6 were added to 38.7 g of the polyester dispersion A1) from Example 2 and homogenized. The weight ratio of component A1) to component A2) was 84:16, based on the resin solids of each component. 27.7 g of polyisocyanate 1) were then simply stirred in. An aqueous binder composition having a processing time of 8 hours was obtained. The aqueous composition had a constant viscosity of approx. 18 s (flow time, measured in DIN beaker 4, at 23° C.) during this period. Adjustment of the viscosity was not required. The binder composition was applied very easily by rolling to form a coating having a dust free drying time of 4 hours. The cured coating possessed good overall properties after curing for 7 days. The solvent, ethanol and water resistance was very good, the mechanical properties were good and the optical properties (flow, richness, brilliance) were also good.

Application example 3
(according to the invention)

27 g of water, 0.5 g of the wetting/flow control agent, 1.5 g of the wetting additive and 1.4 of the 5% aqueous thickener solution (all of which were described in application example 1) and 19.4 g of the polyurethane dispersion A2) from Example 6 were added to 29.0 g of the polyester dispersion A1) from Example 2 and homogenized. The weight ratio of component A1) to component A2) was 64:34, based on the resin solids of each component. 13.8 g of polyisocyanate 1) were then simply stirred in. An aqueous binder composition having a processing time of >8 hours was obtained. The aqueous composition had a constant viscosity of approx. 17 s (flow time, measured in DIN beaker 4, at 23° C.) during this period. Adjustment of the viscosity during the processing time was not required. The binder composition was applied very easily by rolling to form a coating having a dust free drying time of 2 hours. The cured coating possessed good overall properties after curing for 7 days. The solvent, ethanol and water resistance was very good, the mechanical properties were good and the optical properties (flow, richness, brilliance) were also good.

Application example 4
(comparison)

27 g of water, 0.5 g of the wetting/flow control agent, 1.5 g of the wetting additive and 1.4 of the 5% aqueous thickener solution (all of which were described in application example 1) and 43.5 g of the polyurethane dispersion A2) from Example 6 were added to 4.9 g of the polyester dispersion A1) from Example 2 and homogenized. The weight ratio of component A1) to component A2) was 12:87, based on the resin solids of each component. 2.3 g of polyisocyanate 1) were then stirred in. An aqueous binder composition having a processing time of >8 hours was obtained, which has a constant viscosity of approx. 18 s (flow time, measured in DIN beaker 4, at 23° C.) during this period. Adjustment of the viscosity during the processing period was not required. The binder composition was applied very easily by rolling to form a coating having a dust free drying time of 0.5 hours. The cured coating possessed good mechanical properties after curing for 7 days, but the optical properties were only moderate, in particular richness and brilliance were not adequate. The solvent and water resistance was moderate, in particular the ethanol resistance was very poor.

Application examples 5, 6, 7
(according to the invention)

Using the method described in application example 2, polyester dispersion A1) from Examples 3 and 4 and polyester solution A1) from Example 5 were mixed with polyurethane dispersion A2) from Example 6. Mixing ratios: A1) from 3):A2) from 6)=60:40, A) from 4):A2) from 6)=50:50, A1) from 5):A3) from 6)=50:50. After the addition of corresponding amounts of polyisocyanate 1), binder compositions were obtained having processing times of >8 hours and a constant processing viscosity of approx. 20 s (flow time, measured in DIN beaker 4, at 23° C.). Adjustment of the viscosity during the processing period was not required. The binder compositions were applied very easily by rolling to form coatings having a dust free drying times of 1 to 2 hours. After curing for 7 days the coatings possessed good overall properties, i.e., mechanical properties, optical properties and also solvent, ethanol and water resistance.

Application example 8
(comparison)

To demonstrate that polyurethane dispersions were particularly effective as physically drying dispersion A2), a physically drying polyacrylate emulsion copolymer was used as a comparison. The polyacrylate emulsion had a solids content of 39% and was produced from 55% methyl methacrylate, 39% n-butyl acrylate, 2% methacrylic acid, 1% hexanediol bisacrylic acid ester, 0.4% ammonium peroxodisulphate and 2% emulsifier. The aqueous binder composition obtained had a processing time of approx. 6 hours and the viscosity showed a recognizable increase during this time. A coating prepared as described above had a dust free drying time of 6 hours at room temperature. The cured coating possessed only moderate properties after curing for 7 days. Particularly unfavorable were the very low film hardness, the poor mechanical properties such as low hardness, the poor solvent resistance and the inadequate optical properties.

The required property combination of simple handling and simple processing, combined with a long processing time, good optical and mechanical properties and good solvent, ethanol and water resistance, was achieved only with the particular binder compositions according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous binder composition which contains, prior to any reaction between components A1) and B),
    A) 65 to 97 wt % of an aqueous polyol component having a viscosity at 23° C. of 25 to 15,000 mPa.s and containing a mixture of
        A1) at least one dispersion or solution of a hydroxyl group-containing polyester containing carboxylate and/or sulphonate groups, having a weight average molecular weight of 1,000 to 40,000, an OH number of 15 to 100 mg KOH/g dispersion or solution and an acid number, based on all of the carboxylate, carboxyl and sulphonate groups of 2 to 40 mg KOH/g dispersion or solution, wherein the polyester is based on the reaction product of
            a1) 65 to 100 wt % of one or more polyester precursors prepared from a1.1) 0 to 40 wt % of one or more monocarboxylic acids, a1.2) 20 to 65 wt % of one or more di-, tri-, and/or tetrafunctional alcohols, a1.3) 20 to 60 wt % of one or more di- and/or trifunctional carboxylic acids or their anhydrides and a1.4) 0 to 10 wt % of one or more compounds containing sulphonate and carboxyl groups and optionally hydroxyl groups, a2) 0 to 15 wt % of one or more carboxylic acid anhydrides or hydroxycarboxylic acids, a3) 0 to 22 wt % of one or more di- or polyisocyanates and a4) 0 to 8 wt % of one or more mono-, di- and/or trifunctional compounds containing hydroxyl and/or amino groups and A2) at least one physically drying, aqueous polyurethane dispersion, which is substantially free from unreacted hydroxyl and amino groups and contains carboxylate and/or sulphonate groups, and B) 3 to 35 wt % of a polyisocyanate component having a viscosity at 23° C. of 50 to 10,000 mPa.s and containing one or more organic polyisocyanates, wherein components A) and B) are present at an NCO/OH equivalent ratio, based on the isocyanate groups of component B) and the hydroxyl groups of the polyol component A1) of component A), of 0.3:1 to 2:1.

2. The aqueous binder composition of claim 1 wherein component A1) is present in an amount of 40 to 90 wt % and component A2) is present in an amount of 10 to 60 wt % and wherein polyester A1) is based on the reaction product of a1) 85 to 95 wt % of one or more polyester precursors prepared from a1.1) 0 to 40 wt % of one or more monocarboxylic acids, a1.2) 20 to 65 wt % of one or more di-, tri- and/or tetra-functional alcohols and a1.3) 20 to 65 wt % of one or more di- and/or tri-functional carboxylic acids or their anhydrides, and a2) 5 to 15 wt % of one or more acid anhydrides, wherein the percentages of A1) and A2); a1 and a2); and a1.1) to a1.3) add up to 100%.

3. The aqueous binder composition of claim 1 wherein component A1) is present in an amount of 40 to 90 wt % and component A2) is present in an amount of 10 to 60 wt % and wherein polyester A1) is based on the reaction product of a1.1) 0 to 40 wt % of one or more monocarboxylic acids, a1.2) 20 to 60 wt % of one or more di-, tri- and tetrafunctional alcohols, a1.3) 20 to 60 wt % of one or more di- and/or trifunctional carboxylic acids or their anhydrides and a1.4) 2 to 25 wt % of one or more compounds containing sulphonate and carboxyl groups and optionally hydroxyl groups, wherein the percentages of A1) and A2); and a1.1) to a1.4) add up to 100%.

4. The aqueous binder composition of claim 1 wherein component A1) is present in an amount of 40 to 90 wt % and component A2) is present in an amount of 10 to 60 wt % and wherein polyester A1) is based on the reaction product of a1) 70 to 92 wt % of one or more polyester precursors prepared from a1.1) 0 to 40 wt % of one or more monocarboxylic acids, a1.2) 20 to 65 wt % of one or more di-, tri- and tetrafunctional alcohols, a1.3) 20 to 60 wt % of one or more di- and/or trifunctional carboxylic acids or their anhydrides and a2) 2.5 to 7.5 wt % of dimethylol propionic acid, dimethylol butyric acid and/or hydroxypivalic acid, a3) 6 to 22 wt % of one or more di- or polyisocyanates and a4) 0 to 8 wt % of one or more mono-, di- and/or trifunctional compounds containing hydroxyl and/or amino groups, wherein the percentages of A1) and A2); a1) to a4); and a1.1) to a1.3) add up to 100%.

5. The aqueous binder composition of claim 1 wherein component A1) is present in an amount of 40 to 90 wt % and component A2) is present in an amount of 10 to 60 wt % and wherein polyester A1) is based on the reaction product of a1) 73 to 89 wt % of one or more polyester precursors prepared from a1.1) 0 to 25 wt % of one or more monocarboxylic acids, a1.2) 30 to 60 wt % of one or more di-, tri- and tetrafunctional alcohols, a1.3) 28 to 56 wt % of one or more di- and/or trifunctional carboxylic acids or their anhydrides, a2) 2.5 to 7.5 wt % of dimethylolpropionic acid, a3) 7.5 to 19.5 wt % of one or more di- or polyisocyanates and a4) 0 to 6 wt % of one or more mono-, di- and/or trifunctional compounds containing hydroxyl and/or amino groups, wherein the percentages of A1) and A2); a1) to a4); and a1.1) to a1.3) add up to 100%.

6. The aqueous binder composition of claim 1 wherein component A1) is present in an amount of 50 to 85 wt % and component A2) is present in an amount of 15 to 50 wt % and wherein polyester A1) is based on the reaction product of a1) 76 to 87 wt % of one or more polyester precursors prepared from a1.1) 0 to 8 wt % of one or more monocarboxylic acids, a1.2) 40 to 57 wt % of one or more di-, tri- and tetrafunctional alcohols having a molecular weight of 62 to 192, a1.3) 40 to 56 wt % of one or more di- and/or trifunctional carboxylic acids or their anhydride having a molecular weight of 98 to 540, a2) 3.5 to 6.5 wt % of dimethylolpropionic acid, a3) 7.5 to 16.0 wt % of one or more di- or polyisocyanates, provided that at least 50% of component a3) is hexamethylene diisocyanate and a4) 0 to 3 wt % of one or more di- and/or trifunctional alcohols having a molecular weight of 62 to 160, wherein the percentages of A1) and A2); a1) to a4); and a1.1) to a1.3) add up to 100%.

7. The aqueous binder composition of claim 1 wherein polyisocyanate component B) consists essentially of one or more polyisocyanates having aliphatically bound isocyanate groups and containing 8 to 14 wt % of nonionic hydrophilic groups.

8. The aqueous binder composition of claim 2 wherein polyisocyanate component B) consists essentially of one or more polyisocyanates having aliphatically bound isocyanate groups and containing 8 to 14 wt % of nonionic hydrophilic groups.

9. The aqueous binder composition of claim 3 wherein polyisocyanate component B) consists essentially of one or more polyisocyanates having aliphatically bound isocyanate groups and containing 8 to 14 wt % of nonionic hydrophilic groups.

10. The aqueous binder composition of claim 4 wherein polyisocyanate component B) consists essentially of one or more polyisocyanates having aliphatically bound isocyanate groups and containing 8 to 14 wt % of nonionic hydrophilic groups.

11. The aqueous binder composition of claim 5 wherein polyisocyanate component B) consists essentially of one or more polyisocyanates having aliphatically bound isocyanate groups and containing 8 to 14 wt % of nonionic hydrophilic groups.

12. The aqueous binder composition of claim 6 wherein polyisocyanate component B) consists essentially of one or more polyisocyanates having aliphatically bound isocyanate groups and containing 8 to 14 wt % of nonionic hydrophilic groups.

13. A rigid, non-flexible substrate coated with the aqueous binder composition of claim 1.

* * * * *